Nov. 2, 1965　　　A. M. KUHLMANN　　　3,215,522
SILICON METAL PRODUCTION
Filed Nov. 22, 1960
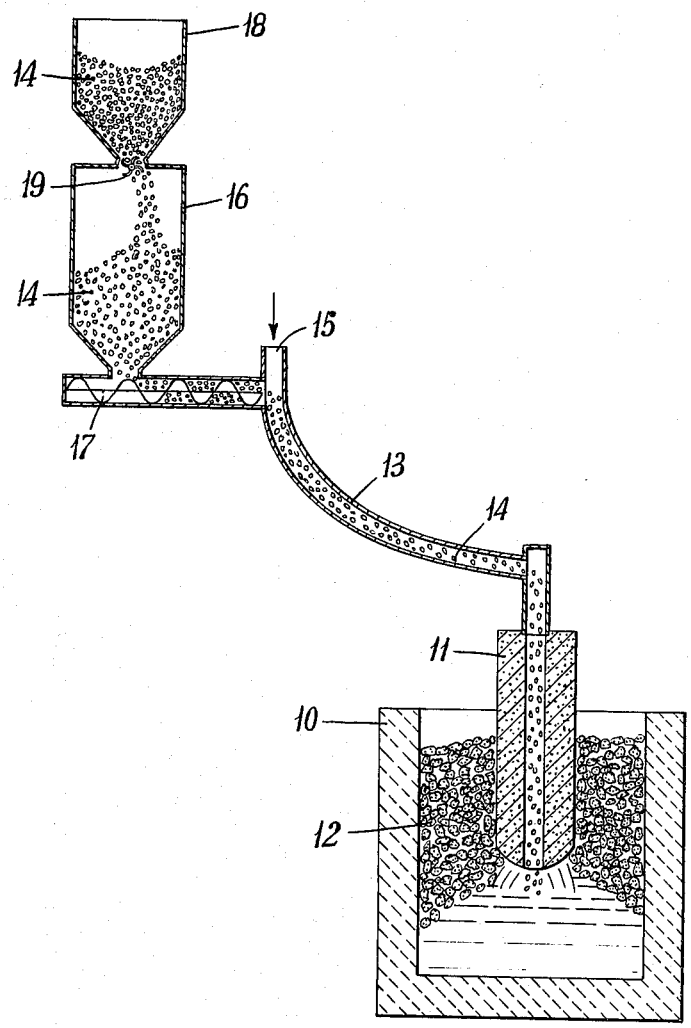
INVENTOR.
AUGUST M. KUHLMANN
BY Leo A. Plum, Jr.
ATTORNEY United States Patent Office 3,215,522
Patented Nov. 2, 1965

3,215,522
SILICON METAL PRODUCTION
August M. Kuhlmann, Niagara Falls, N.Y., assignor to Union Carbide Corporation, a corporation of New York
Filed Nov. 22, 1960, Ser. No. 71,035
8 Claims. (Cl. 75—10)

This invention relates to a process for the production of silicon metal and silicon metal-bearing alloys in the electric furnace.

Silicon metal is produced in the electric-arc furnace by the reduction of silica by a carbonaceous reducing agent yielding silicon metal and carbon monoxide gas. Such carbonaceous materials as coke, coal, and wood chips are used. Since the charge of silica and carbonaceous material is piled deep around the base of a carbonaceous electrode and a submerged arc used to heat the charge, it is necessary to exercise control over the porosity of the mix to allow for escape of the evolved carbon monoxide gas. A charge containing substantially large amounts of fine particles causes the furnace to operate in a less than satisfactory manner because of the low porosity and, in fact, causes the loss of much of this fine material due to its entrainment and escape in the blow out of the strong currents of carbon monoxide gas. In general, particles of silica and carbonaceous material of a size less than ¼ inch are considered fines and are removed from the charge by screening if they represent so great a proportion of the charge material as to cause the above-mentioned difficulties. Unfortunately other considerations, economic and technical, favor the use of raw materials containing relatively large amounts of fines.

It has been found, for example, that superior silicon metal is produced when the carbonaceous reducing agent is of a low iron content, such as petroleum coke. Other cokes, such as by-product coke or coal, contain from about 5 to 15 percent ash, of which approximately 25 percent is iron oxide. The iron in this material is carried over into the silicon metal. The occurrence of residual iron in aluminum alloys treated with this iron-containing silicon adversely affects the aluminum alloy.

Petroleum coke, though low in iron-containing ash, contains much fine material when produced by the fluidized bed method. Petroleum coke produced in static stills in the form of large lumps is very brittle and produces many fines when crushed to a desired size for a furnace feed material. The use of this material in presently used electric furnaces, however, results in poor furnace efficiency because of the porosity problem and the gaseous entrainment and blow out of the fines.

Another problem associated with the operation of silicon-producing electric furnaces is the high rate of electrode consumption requiring frequent shutdowns for electrode slipping. Such a high rate of electrode consumption is not only uneconomical, but the shutdowns adversely affect the operating efficiency of the furnace.

Many silicon-bearing alloys are also produced in the electric arc furnace by methods similar to that described above for the production of silicon metal. By reacting silica, reducible compounds of the desired alloy ingredients or the reduced metals themselves and carbonaceous reducing agents in an electric furnace such silicon-bearing alloys as ferrosilicon, silicomanganese, ferromanganese-silicon, ferrochromium-silicon, calcium-silicon, zirconium-ferrosilicon, and calcium-manganese silicon may be produced. All of these electric arc processes could be carried out more economically if the fines could be used.

It is the primary object of this invention, therefore, to provide a process for the production of silicon metal in the electric furnace wherein fine particles of the reactants are advantageously utilized without adversely affecting the operation of the furnace.

It is another object of the present invention to provide a process for the production of silicon metal-bearing alloys in the electric furnace.

It is also an object of this invention to provide a process for the production of silicon in the electric furnace wherein the electrode consumption is substantially reduced.

Other aims and advantages of the invention will be apparent from the following description and the appended claims.

The drawing shows a vertical sectional view of a silicon metal producing furnace using the process of this invention.

In accordance with these objects a process for producing silicon metal is provided comprising packing a mixture of silica and a carbonaceous reducing agent around at least one hollow carbonaceous electrode in an electric furnace, and during the course of the heating of the charge passing particles of either or both of the reactants through the hollow electrode into the reaction zone of the furnace, whereby the particles are reacted at the tip of the hollow electrode to produce silicon metal and carbon monoxide gas. The use of the term "packing" does not mean tamping the charge in place but rather only placing it around the electrodes. The total amounts of silica and carbonaceous reducing agent, present as charge material or fines fed through the hollow electrode, is maintained in at least the stoichiometric proportions required for forming silicon metal. To produce silicon metal-bearing alloys the alloy ingredients are added to the electric furnace with the silica as reducible compounds or as already reduced metal. The reducible alloy compounds can also be fed through the hollow electrode.

For the purposes of this invention, the carbonaceous reducing agents may be coal, by-product coke or petroleum coke, silicon carbide, and wood.

A carrier gas is advantageously utilized to help transmit the particles to the hollow electrode and to prevent the rising of evolved carbon monoxide gas into the hollow electrode.

In the drawing an electric furnace 10 is shown provided with a hollow electrode 11. A charge 12 of silica and carbonaceous reducing agent is packed around the hollow electrode 12. A conduit 13 feeds particles 14 of either or both reactants to the top of the hollow electrode where the particles descend to the furnace. A pressure storage tank or cylinder (not shown) is connected to gas inlet means 15 located on the conduit 13. The particles are stored in a pressure-tight hopper 16. The particles are carried from the hopper 16 to the conduit 13 by the screw conveyor 17. Open hopper means 18 contains the particles which are fed to the pressurized hopper 16 in a controllable rate by pressure-tight valve means 19.

In the practice of one embodiment of the invention, a mixture of silica and carbonaceous reducing agent, from which the interfering portion of fine particles have been removed, is charged to the electric furnace around the hollow electrode. Electrical energy in the form of a submerged arc supplies the heat required to convert the mixture to silicon metal and carbon monoxide gas. During this reaction fine particles of silica and/or carbonaceous reducing agent are fed through the conduit into the hollow electrode. A flow of gas from the gas inlet means ensures the free passage of the particles through the conduit and into the hollow electrode. The pressure of the gas should be sufficient to balance the pressure of gases and vapors evolved in the furnace so that none of these gases and vapors will flow up the hollow electrode. Otherwise the silicon and silicon monoxide vapors and carbon monoxide gas would flow up the hollow electrode with the condensation of silicon inside the hollow electrode tending to bridge the hollow electrode and clog it, preventing the downward flow of any more reactants.

A pressure and flow of gas sufficient to provide for a flow of gas down the hollow electrode may also be used. In such a case, the free fall of the particles down through the hollow electrode is ensured. Additionally the downward flow of gas ensures that the gases present in the furnace will not flow up the hollow electrode and, therefore, there will be no condensation of silicon and silicon monoxide vapor at the hollow electrode tip and no escape of carbon monoxide to the amosphere. The gas employed may also be utilized as a carrier gas for the particles of reactants so that they are fed through the hollow electrode and discharged directly into the reaction zone of the electric furnace. Any gas which does not adversely affect the reactants and reaction products, such as carbon monoxide, hydrogen, methane, natural gas, etc., can be employed for this process.

The distribution of the particles at the electrode tip is believed to be contributing factor in the reduction of electrode consumption experienced in the use of this system. The manner in which the particles aid in reducing electrode consumption is not clearly understood, but it is believed that the presence of these particles effects a heat transfer mechanism, thereby lowering the temperature in the arc zone. Because of the lower temperature, less silicon monoxide is formed and consequently less chemical corrosion of the electrode tip takes place. In addition the invention has the added advantage of permitting deeper electrode penetration into the reaction zone.

As is well known in the art silicon smelting is most efficiently carried out with a submerged arc. In an open arc operation too much heat is lost by radiation, and the mix is not preheated by the hot carbon monoxide evolved. Additionally silicon monoxide is lost, condensing outside the reaction zone. In the submerged arc operation a good part of the silicon monoxide is condensed by the relatively colder charge materials on top of the furnace burden and is thus recirculated and reacted to form silicon. And of course the hot carbon monoxide gives up much of its heat to the descending charge. By preventing the clogging of the charge caused by fines through their introduction in the hollow electrode, and by the cooling effect of the particles at the hollow electrode tip, the submerged arc process is made more efficient and practical; especially since deeper electrode penetration is possible.

It is desirable, although not critical to the success of the invention, that the passage in the hollow electrode have a diameter of at least about eight times the diameter of the largest-sized particles being passed therethrough to ensure a free fall of these particles into the reaction zone of the furnace.

For the purposes of this invention the carbon of the hollow electrode can be in the amorphous form or the graphitic form and the hollow electrode can be of the prebaked or self-baking type.

In another embodiment of the invention for the production of silicon metal a charge of silica, silicon carbide, and coke is packed around the electrode and a mixture of fine particles of silica and silicon carbide and/or coke is fed through the hollow electrode. The silicon carbide decomposes in the heat of the furnace reaction zone to silicon metal and carbon. The carbon thereupon acts as a reducing agent for the silica. Depending on the amount of carbon already present in the furnace as coke and that supplied by the decomposition of the silicon carbide, coke fines may or may not be required to be fed through the hollow electrode with the silica and silicon carbide. An excess of from one to five percent by weight carbon over the stoichiometric amount required may be used.

As an illustration of the practice of the invention, several examples are given below. It is to be noted that the material passed as particles through the hollow electrode may be a mixture of a silicon-containing agent and a carbonaceous reducing agent or one of these agents alone may be passed through the hollow electrode. It is only necessary to maintain in the furnace a correct overall silicon metal-forming proportion of silica, other reducible alloy compounds, if any, and carbonaceous reducing agent, i.e., the total amount of the reactants charged around the hollow electrode plus the total amount of the fines fed through the hollow electrode must be in proper proportions. Depending upon the amount of reactants charged around the hollow electrode, therefore, any desired ratio of silicon-containing agent, such as silica, and carbonaceous reducing agent, from 0 percent by weight silica and 100 percent by weight carbonaceous reducing agent, to 0 percent carbonaceous reducing agent and 100 percent silicon-containing agent can be fed into the reaction zone of the furnace through the hollow electrode.

In Example No. 1 a silica-coke mixture was used both for the charge material and, in the form of fine particles, the hollow electrode feed. In Example No. 2 a silica, coke, and coal mixture was used for the charge while a mixture of silica and silicon carbide was fed through the hollow electrode. The use of silicon carbide in the hollow electrode feed material is particularly advantageous in that less gas volume per unit of metal is produced. This decrease in gas volume lessens the possibility of porosity and permeability problems.

EXAMPLE NO. 1

A charge material consisting of wood chips, low-sulfur petroleum coke, low-ash coke, and quartzite was charged around a hollow electrode in a signal phase cylindrical furnace having an inside shell diameter of 8 feet. The shell of this furnace had quartz sides and a carbon hearth. The 24 inch diameter single hollow coal carbon electrode used in the furnace had a longitudinal passageway of about 4 inches in diameter.

The materials employed had the following analysis:

*Quartzite (2½" x 1")*

| | Percent |
|---|---|
| $SiO_2$ | 99.67 |
| $Fe_2O_3$ | 0.18 |
| $Al_2O_3$ | 0.08 |
| $CaO+MgO$ | 0.03 |
| Loss on ignition (1000° C.) | 0.04 |
| | 100.00 |

*Low-sulfur petroleum coke*

| | Percent |
|---|---|
| Fixed carbon | 84.32 |
| VCM (Volatile combustible materials) | 15.58 |
| Ash | 0.10 |
| | 100.00 |

*Analysis of ash of petroleum coke*

| | Percent |
|---|---|
| $Fe_2O_3$ | 0.03 |
| $SiO_2$ | 0.04 |
| $Al_2O_3$ | 0.01 |
| $CaO$ | 0.02 |
| $MgO$ | 0.01 |
| | 0.11 |

*Low-ash coal*

| | Percent |
|---|---|
| Fixed carbon | 73.23 |
| VCM | 24.55 |
| Ash | 2.22 |
| | 100.00 |

Analysis of ash of coal

| | Percent |
|---|---|
| $Fe_2O_3$ | 0.21 |
| $SiO_2$ | 0.94 |
| $Al_2O_3$ | 0.57 |
| CaO | 0.13 |
| MgO | 0.03 |
| | 1.88 |

Wood chips

| | Percent |
|---|---|
| Fixed carbon | 18.56 |
| VCM | 70.44 |
| Ash | 2.66 |
| | 91.66 |

Analysis of ash of wood chips

| | Percent |
|---|---|
| $Fe_2O_3$ | 0.05 |
| $SiO_2$ | 0.12 |
| $Al_2O_3$ | 0.03 |
| CaO | 2.27 |
| MgO | 0.13 |
| MnO | 0.06 |
| | 2.66 |

17,220 pounds of this charge material was fed around the hollow electrode in a series of batch additions of the following typical content:

Furnace mix order

| | Pounds |
|---|---|
| Quartz | 250 |
| Low-ash coal | 46 |
| Low-sulfur petroleum coke | 46 |
| Wood chips | 150 |
| | 492 |

About 5.5 percent of the silicon requirements were fed to the furnace as fines through the hollow electrode. Additionally fine particles of petroleum coke were mixed with the silica. It is an important advantage that by the use of this process, silica sands which have a lower iron content than the larger quartzite can be used as well as the low iron-containing petroleum coke fines. This electrode feed material had the following analysis:

| Silica sand: | 32 mesh and down, percent |
|---|---|
| $SiO_2$ | 99.54 |
| $Fe_2O_3$ | 0.10 |
| $Al_2O_3$ | 0.07 |
| CaO+MgO | 0.07 |
| Loss on ignition (at 1000° C.) | 0.22 |
| | 100.00 |

| Low-sulfur petroleum Coke fines: | 8 mesh and down, percent |
|---|---|
| Fixed carbon | 85.61 |
| VCM | 13.88 |
| Ash | 0.51 |
| Fe | 0.04 |
| | 100.04 |

This mixture was fed through the hollow electrode in a carrier gas composed of carbon monoxide in batches having the following typical content:

Electrode mix order

| | Pounds |
|---|---|
| Silica sand | 100 |
| Petroleum coke fines | 42 |
| | 142 |

This silicon metal produced in this furnace operation had the following average analysis:

| | Percent |
|---|---|
| Si | 96.74 |
| Fe | 1.63 |
| Al | 0.44 |
| Ca | 1.19 |
| | 100.00 |

The silicon metal product is thus seen to be of a high purity and to have a sufficiently low iron content to enable its use in many applications.

There were no porosity problems encountered in the run and there was little loss of the fines fed through the hollow electrode due to entrainment in the carbon monoxide gas.

The electrode consumption per net ton of silicon metal was 273 pounds of electrode. This amounts to a saving of 18 percent in electrode consumption over solid electrode operation.

EXAMPLE NO. 2

In this example of the invention the furnace feed material consisted of 2½" x 1" quartz, 1¾" x ¾" Low Ash Nut Coal, Low Sulfur Petroleum Coke and Wood Chips.

The materials employed had the following analysis:

Quartzite (2½" x 1")

| | Percent |
|---|---|
| $SiO_2$ | 99.67 |
| $Fe_2O_3$ | 0.18 |
| $Al_2O_3$ | 0.08 |
| Ca+MgO | 0.03 |
| L.O.I. (1000° C.) | 0.04 |
| | 100.00 |

Low S. pet. coke

| | Percent |
|---|---|
| F. C. | 84.32 |
| VCM | 15.58 |
| Ash | 0.10 |
| | 100.00 |

Ash (of pet. coke)

| | Percent |
|---|---|
| $Fe_2O_3$ | 0.03 |
| $SiO_2$ | 0.04 |
| $Al_2O_3$ | 0.01 |
| CaO | 0.02 |
| MgO | 0.01 |
| | 0.11 |

Low ash coal

| | Percent |
|---|---|
| F.C. | 73.23 |
| VCM | 24.55 |
| Ash | 2.22 |
| | 100.00 |

Ash (of coal)

| | Percent |
|---|---|
| $Fe_2O_3$ | 0.21 |
| $SiO_2$ | 0.94 |
| $Al_2O_3$ | 0.57 |
| CaO | 0.13 |
| MgO | 0.03 |
| | 1.88 |

Wood chips

| | Percent |
|---|---|
| F.C. | 18.56 |
| VCM | 70.44 |
| Ash | 2.66 |
| | 91.66 |

Ash (of wood chips)

| | Percent |
|---|---|
| $Fe_2O_3$ | 0.05 |
| $SiO_2$ | 0.12 |
| $Al_2O_3$ | 0.03 |
| CaO | 2.27 |
| MgO | 0.13 |
| MnO | 0.06 |
| | 2.66 |

39,185 pounds of this mix were fed as furnace feed materials around the hollow electrode in a single phase cylindrical furnace having an inside shell diameter of 8 feet. The sides of the shell were of quartz and a carbon hearth was employed. The twenty-four inch diameter single hollow coal carbon electrode had a central passage of about four inches in diameter.

The furnace feed material was charged in batch additions of the following typical content:

Furnace mix order

| | Pounds |
|---|---|
| Quartz | 250 |
| Low-ash coal | 48 |
| Low-sulfur petroleum coke | 48 |
| Wood chips | 150 |
| | 490 |

Approximately 10 percent of the total silicon feed was introduced through the hollow electrode. In this run the hollow electrode feed mixture was composed of silicon carbide and silica sand having the following analysis:

Silicon carbide

| | Percent |
|---|---|
| SiC | 95.99 |
| Free C | 1.52 |
| Free $SiO_2$ | 1.62 |
| Free Si | 0.33 |
| Al | 0.27 |
| Fe | 0.14 |
| Ca | 0.08 |
| Mg | 0.05 |
| | 100.00 |

| Silica sand: | 32 mesh and down, percent |
|---|---|
| $SiO_2$ | 99.54 |
| $Fe_2O_3$ | 0.10 |
| $Al_2O_3$ | 0.07 |
| L.O.I. (at 1000° C.) | 0.22 |
| | 100.00 |

It should be noted that applicant's invention allows for the advantageous use of silicon carbide in small sizes which formerly were found undesirable in silicon-producing furnaces.

1,635 pounds of this electrode mix was fed to the furnace in a carrier gas composed of furnace gas (primarily carbon monoxide) through the hollow electrode. A typical batch mix order for this feed is presented below.

Hollow electrode mix order

| | Pounds |
|---|---|
| Silicon carbide | 100 |
| Silica sand | 93.5 |

The silicon metal produced had the following average analysis:

| | Percent |
|---|---|
| Si | 97.63 |
| Fe | 1.53 |
| Al | 0.45 |
| Ca | 0.39 |
| | 100.00 |

The silicon metal produced by this process is thus seen to be of a high purity.

The hollow electrode consumption per net ton of silicon metal was 237 pounds. This is a saving of 29 percent in electrode consumption over a solid electrode furnace operation.

As stated in the objects and statements of the invention, silicon metal-bearing alloys may also be produced by this method. A charge comprising a mixture of silica, reducible compounds of the desired alloy ingredients, or the reducible metals themselves and carbonaceous reducing agents are packed around at least one hollow carbonaceous electrode and electrical energy is supplied to the electrode to furnish heat to the charge while particles of one or more of the reactants are fed through the hollow electrode into the reaction zone to produce reduced silicon metal, reduced alloy metal, and carbon monoxide. The reduced metals will alloy in proportions determined by the amount of each present in the charge materials.

In the following examples the furnace charge mix and electrode feeds mix for the production of the indicated silicon metal-bearing alloys are given.

EXAMPLE NO. 3

To produce ferrosilicon of any content of silicon it is only necessary to add scrap steel to the electric furnace during the reaction of silica and a carbonaceous reducing agent. The scrap steel being an already reduced metal is not a reactant and need not be added to the electrode feed mix.

In this and other cases where iron-base alloys are being produced it is not necessary to use low-iron petroleum coke for coal or ordinary coke may be used.

EXAMPLE NO. 4

In the production of silicomanganese containing from 12 to 20 percent silicon, up to about 2 percent carbon, and the balance manganese, a furnace charge mix is prepared containing manganese ore, quartzite, coal or coke and slag-forming material. The slag former may be dolomite or a manganese slag from a standard or medium carbon-ferromanganese operation. The slag-forming material is not a reactant and need not be added through the hollow electrode.

The electrode feed mix would consist of particulated silica sand and coke, manganese ores and coke, or all three reactants. The total amounts of quartzite, manganese ores, silica sand and carbonaceous agents are regulated to produce a silicomanganese of the desired composition.

EXAMPLE NO. 5

In the production of ferromanganese-silicon which contains from 28 to 30 percent silicon and the balance iron and manganese plus small amounts of carbon, a furnace charge mix is prepared containing manganese ores, quartzite, coal or coke and ferromanganese or scrap steel to supply the needed iron. A slag may or may not be used.

The electrode feed mix would consist of particulated silica sand and coke, manganese ores and coke, or all three reactants. The total amounts of the quartzite, manganese ores, silica sand, carbonaceous agents, and iron-containing materials are proportioned to give the desired composition and silicon content to the ferromanganese-silicon.

EXAMPLE NO. 6

Ferrochrome-silicon containing from 40 to 50 percent silicon, about 40 percent chromium, small amounts of carbon and the balance iron may be produced by first preparing a furnace charge mix containing chromium ores, quartzite, coal or coke and an iron-containing material such as ferrochrome or scrap steel and placing the mix around the hollow electrode. The hollow electrode charge may be particulated silica sand and coke, chromium ore and coke, or all three reactants.

The total amount of chromium ore, quartzite, coal and coke, silica sand, and iron-containing materials are proportioned to give ferrochromium-silicon of the desired composition and silicon content.

EXAMPLE NO. 7

Ferrochromium-silicon can also be produced by merely adding high-carbon ferrochrome to the quartzite and coal or coke charge of a silicon-making operation. The electrode feed material would be silica sand and coke.

EXAMPLE NO. 8

Calcium-silicon containing about 30 to 33 percent calcium, about 60 to 65 percent silicon, and a small amount of iron can be produced by preparing a furnace charge mix consisting of lime, quartzite and coal.

An electrode feed mix containing fine lime, silica sand, and coke alone or in combination may be used. The total amount of the materials, whether added in the furnace charge mix or through the hollow electrode, is regulated to give calcium-silicon of the desired proportions.

EXAMPLE NO. 9

Calcium-silicon can also be produced using a furnace charge mix of calcium carbide, quartzite, and coal. The electrode feed mix can be calcium carbide fines, silica sand and coke, silica sand and calcium carbide, or all three reactants. As before the total amount of reactants added in the furnace charge as well as in the electrode feed mix should be proportioned to produce calcium-silicon of the desired proportions.

EXAMPLE NO. 10

Calcium-silicon can also be produced using lime, calcium carbide and coal in the furnace charge mix. The electrode feed mix, proportioned with the furnace charge mix to yield calcium-silicon of the desired proportions, may be lime and coke, silicon carbide, or silicon carbide coke and/or lime.

EXAMPLE NO. 11

Zirconium-ferrosilicon containing from about 12 to 15 percent zirconium, 39 to 43 percent silicon, and 40 to 45 percent iron plus small amounts of carbon can be made by the hollow electrode process of this invention. The furnace charge mix should be briquetted zircon sand, quartzite, coal and coke. Some steel scrap may also be added as needed.

The electrode feed mix may be zircon sand fines, silica sand and coke.

The higher zirconium grades (35 to 40 percent zirconium) may also be produced by so proportioning the reactants.

EXAMPLE NO. 12

Calcium-manganese-silicon containing 16 to 20 percent calcium, 14 to 18 percent manganese, and 35 to 59 percent silicon is produced using a furnace charge mix as set forth below:

Mix 1—Manganese ore.
Mix 2—Manganese ore and Manganese slag from ferromanganese operation.
Mix 3—Manganese ore and silicomanganese.
Mix 4—Manganese ore and silicomanganese and manganese slag.

plus
(1) lime and coal and quartzite.
(2) calcium carbide, quartzite and coal.
(3) lime, silicon carbide, and coal.

Any one of the mixes in the left-hand column may be combined with any of the mixes in the right-hand column to form the furnace charge mix. The hollow electrode feed may be similarly selected using fines of the reactants.

It is to be noted that generally only reactants are fed through the hollow electrode; therefore only compounds to be reduced and carbonaceous reducing agents are fed through the hollow electrode. Reduced metals or slag-forming agents need not be passed through the hollow electrode.

It is seen therefore that a significant contribution to the metallurgical art has been made, for by the use of applicant's process superior silicon metal and silicon metal bearing alloys can be produced while simultaneously advantageous use can be made of fine charge materials, which were formerly undesirable, and furthermore that significant reductions in electrode consumption can also be made.

It should also be noted the description of the invention above has been in terms of its specific embodiments, and that this disclosure is intended to be illustrative of, and not necessarily to constitute a limitation upon, the scope of the invention.

What is claimed:

1. An electric furnace submerged arc process employing a hollow electrode for the production of silicon from both coarse and fine particles of silica and carbonaceous reducing agent said process comprising
   (1) embedding the electrode in a packed mixture formed of coarse particles of carbonaceous reducing agent and silica
   (2) providing a submerged arc at the tip of the electrode to thereby provide a silicon forming reaction zone at the tip of the electrode
   (3) passing fine particles of material corresponding to at least one component of the packed mixture through the hollow electrode into said submerged arc silicon-forming reaction zone and
   (4) passing a flow of gas through the hollow electrode toward the tip thereof sufficient to prevent gases from passing from the furnace through the electrode and sufficient to permit the free flow of said fine particles through the electrode into said reaction zone.

2. A process in accordance with claim 1 for producing a silicon-containing alloy wherein coarse particles of at least one material selected from the group consisting of chromium ore, manganese ore, lime, and zirconium sand are included in the packed mixture in which the electrode is embedded.

3. An electric furnace submerged arc process employing a hollow electrode for the production of silicon from both coarse and fine particles of silica and carbonaceous reducing agent said process comprising
   (1) embedding the electrode in a packed mixture formed of coarse particles of carbonaceous reducing agent and silica, said coarse particles having a diameter greater than about ¼ inch
   (2) providing a submerged arc at the tip of the electrode to thereby provide a silicon forming reaction zone at the tip of the electrode
   (3) passing fine particles of a material corresponding to at least one component of the packed mixture through the hollow electrode into said submerged arc silicon-forming reaction zone, said fine particles having a diameter of less than about ¼ inch and
   (4) passing a flow of gas through the hollow electrode toward the tip thereof sufficient to prevent gases from passing from the furnace through the electrode and sufficient to permit the free flow of said fine particles through the electrode into said reaction zone.

4. A process in accordance with claim 3 for producing a silicon-containing alloy wherein coarse particles of a material selected from the group consisting of chromium ore, manganese ore, lime, and zirconium sand are included in the packed mixture in which the electrode is embedded.

5. An electric furnace submerged arc process employing a hollow electrode for the production of silicon from silica comprising both coarse and fine particles and from carbonaceous reducing agent comprising both coarse and fine particles said process comprising
   (1) separating the coarse particles of silica from the fine silica particles and separating the coarse carbonaceous reducing agent particle from the fine carbonaceous reducing agent particles
   (2) embedding the electrode in a mixture formed of the separate coarse particles of silica and carbonaceous reducing agent
   (3) providing a submerged arc at the tip of the electrode to thereby provide a silicon forming reaction zone at the tip of the electrode
   (4) passing the separated fine particles of silica and carbonaceous reducing agent through the hollow electrode into said submerged arc silicon-forming reaction zone and
   (5) passing a flow of gas through the hollow electrode toward the tip thereof sufficient to prevent gases from passing from the furnace through the electrode and sufficient to permit the free flow of said fine particles through the electrode into said reaction zone.

6. A process in accordance with claim 5 for producing a silicon containing alloy wherein coarse particles of a material selected from the group consisting of chromium ore, manganese ore, lime, and zirconium sand are included in the packed mixture in which the electrode is embedded.

7. A process in accordance with claim 1 for producing a silicon-containing alloy wherein metallic iron is present in the electric furnace during the silicon-forming reaction.

8. A process in accordance with claim 2 for producing a silicon containing alloy wherein metallic iron is present in the electric furnace during the silicon-forming reaction.

References Cited by the Examiner
UNITED STATES PATENTS

| | | | |
|---|---|---|---|
| 866,597 | 9/07 | Price | 75—10 |
| 906,854 | 12/08 | Becket | 75—11 |
| 915,172 | 3/09 | Goldschmidt | 75—11 |
| 942,349 | 12/09 | Price | 75—11 |
| 1,193,783 | 8/16 | Hillhouse | 75—10 |
| 1,425,572 | 8/22 | Becket | 75—10 |
| 1,715,155 | 5/29 | Westberg | 75—11 |
| 1,932,831 | 10/33 | Scott | 75—10 |
| 2,176,689 | 10/39 | Udy | 75—11 |
| 2,303,973 | 12/42 | Armstrong | 75—10 |
| 2,909,422 | 10/59 | Schwabe | 75—10 |

FOREIGN PATENTS 220,177  2/59  Australia.

BENJAMIN HENKIN, *Primary Examiner.*

RAY K. WINDHAM, MARCUS U. LYONS, WINSTON A. DOUGLAS, DAVID L. RECK, *Examiners.*